US009422718B2

(12) United States Patent
Ehsani

(10) Patent No.: US 9,422,718 B2
(45) Date of Patent: Aug. 23, 2016

(54) REPAIR AND STRENGTHENING OF STRUCTURES WITH HEAT-CURED WRAP

(71) Applicant: Mohammad R. Ehsani, Tucson, AZ (US)

(72) Inventor: Mohammad R. Ehsani, Tucson, AZ (US)

( * ) Notice: Subject to any disclaimer, the term of this patent is extended or adjusted under 35 U.S.C. 154(b) by 257 days.

(21) Appl. No.: 14/142,659

(22) Filed: Dec. 27, 2013

(65) Prior Publication Data

US 2015/0183169 A1    Jul. 2, 2015

(51) Int. Cl.

| | |
|---|---|
| *E04B 1/04* | (2006.01) |
| *E04B 2/14* | (2006.01) |
| *E04B 2/64* | (2006.01) |
| *E04F 13/073* | (2006.01) |
| *E04F 13/08* | (2006.01) |
| *B29C 65/02* | (2006.01) |
| *B29C 65/18* | (2006.01) |
| *B29C 65/34* | (2006.01) |
| *E04C 5/07* | (2006.01) |

(Continued)

(52) U.S. Cl.
CPC .............. *E04C 5/076* (2013.01); *B29C 63/0021* (2013.01); *B29C 70/34* (2013.01); *B32B 37/146* (2013.01); *F16L 9/00* (2013.01); *F16L 55/16* (2013.01); *F16L 55/1686* (2013.01); *B29C 63/06* (2013.01); *B29C 63/10* (2013.01); *B29C 63/14* (2013.01); *B29K 2101/10* (2013.01); *B29K 2105/0872* (2013.01); *B29L 2009/00* (2013.01); *B29L 2031/765* (2013.01); *B29L 2031/776* (2013.01); *B32B 2310/08* (2013.01); *B32B 2607/00* (2013.01)

(58) Field of Classification Search
USPC .......... 156/71, 184, 189, 272.2, 273.3, 275.5, 156/379.6, 379.7, 380.2, 499
See application file for complete search history.

(56) References Cited

U.S. PATENT DOCUMENTS

| | | | | | |
|---|---|---|---|---|---|
| 4,090,002 | A | * | 5/1978 | Rosenblum | ............... D03D 1/00 156/148 |
| 5,447,593 | A | * | 9/1995 | Tanaka | ....................... E04C 3/29 156/306.9 |
| 6,536,991 | B1 | * | 3/2003 | Trader | ....................... E02D 5/64 405/211 |

FOREIGN PATENT DOCUMENTS

| | | | | | |
|---|---|---|---|---|---|
| JP | | 04029808 A | * | 1/1992 | ............. B29B 15/12 |
| JP | | 2000167856 A | * | 6/2000 | ............. B29C 43/18 |

OTHER PUBLICATIONS

Machine Translation of JP 2000-167856 (Nov. 20, 2015).*

(Continued)

*Primary Examiner* — Sing P Chan
(74) *Attorney, Agent, or Firm* — Arjomand Law Group, PLLC

(57) ABSTRACT

A method and an article of manufacture are disclosed for reinforcing various structures, such as pipes, piles, walls, tanks, silos, chimneys, and the like, constructed from various materials including steel, concrete, masonry, wood, plastics, and the like. Some of the various structures may be used to transport water, gas, oil, and the like. Multiple layers of various material sheets, each sheet having substantially the same or different properties, may be impregnated with resin and wrapped around or attached to the surface of a structure to be reinforced or to the surface of a spacer shell surrounding the structure and subjected to heat to cure the resin and to bond the reinforcement sheets to the structure or the spacer shell. The multiple layers together constitute a heat-cured structure reinforcement wrap (HRW) to reinforce the structure against external and internal loads, such as weight, impact load, blast load, internal pressure, ballistic load, and the like.

20 Claims, 6 Drawing Sheets

(51) Int. Cl.
  *B32B 37/14* (2006.01)
  *B29C 63/00* (2006.01)
  *F16L 55/16* (2006.01)
  *B29C 70/34* (2006.01)
  *F16L 9/00* (2006.01)
  *F16L 55/168* (2006.01)
  *B29L 9/00* (2006.01)
  *B29L 31/00* (2006.01)
  *B29K 101/10* (2006.01)
  *B29K 105/08* (2006.01)
  *B29C 63/06* (2006.01)
  *B29C 63/10* (2006.01)
  *B29C 63/14* (2006.01)

(56) References Cited

OTHER PUBLICATIONS

English Abstract of JP 2000-167856 (Nov. 23, 2015).*
English Abstract of JP 04-029808 (Nov. 23, 2015).*

\* cited by examiner (A): Deflated Packer (B): Inflated Packer

REPAIR AND STRENGTHENING OF STRUCTURES WITH HEAT-CURED WRAP

CROSS-REFERENCE(S) TO RELATED APPLICATION(S)

This application claims the benefit of the filing date of the U.S. Provisional Patent Application 61/962,357, entitled "REPAIR AND STRENGTHENEING OF STRUCTURES WITH HEAT-CURED WRAP," filed on 6 Nov. 2013, under 35 U.S.C. §119. This application is also related to the allowed patent application Ser. No. 13/409,688, the specifications of which are incorporated herein in their entirety by reference.

TECHNICAL FIELD

This application relates generally to construction. More specifically, this application relates to a method and apparatus for reinforcing structures with a heat-cured resin-impregnated reinforcement wrap.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
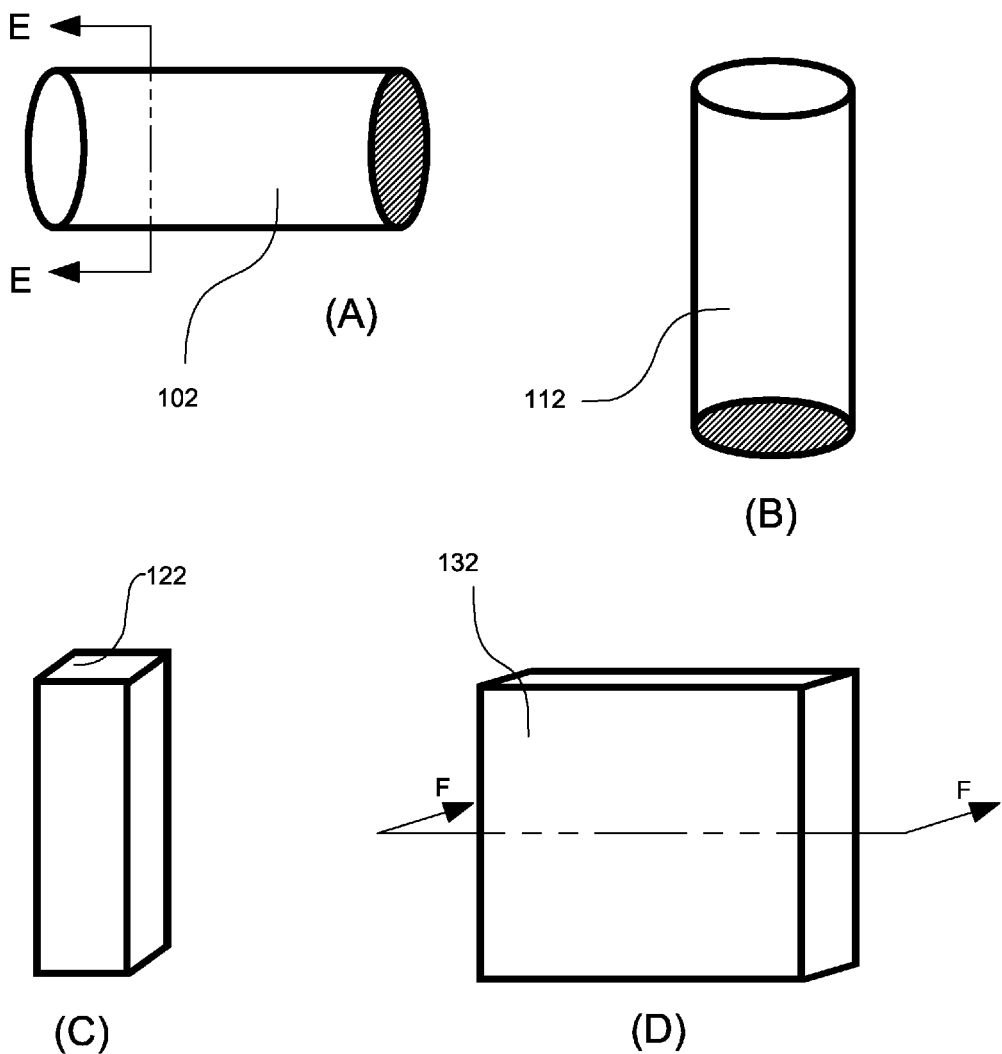
FIGS. 1A-1D show example structures suitable to be reinforced by heat-cured resin-impregnated reinforcement wraps (HRW)

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references using one or more layers of reinforcement fabric sheets to reinforce cylindrical structures, such as pipes, it will be appreciated that the disclosure may include fewer or more layers of reinforcement fabric sheets to reinforce other types of structures, such as beams, slabs, walls, columns, piles, sheet piles, silos, chimneys and the like.

Briefly described, a method, a system, and an article of manufacture are disclosed for reinforcing various structures, such as pipes, ducts, vessels, tanks, silos, beams, columns, walls, slabs and the like, constructed from various materials including, but not limited to steel, concrete, masonry, wood, plastics, and the like. Some of the various structures may be used to transport water, gas, oil, and the like, while other such various structures may be used as storage, human-occupied buildings, computer and equipment facilities, retaining walls and sheet piles to hold back soil or water and the like. Multiple layers of various material sheets, each sheet having substantially the same or different properties saturated or impregnated with a resin, may be wrapped around, laid over, or otherwise attached to a surface of a structure to be reinforced or may be wrapped around, laid over, or otherwise attached to a surface of a spacer shell which itself surrounds the structure to be reinforced, as will be described in detail. Sheets may be impregnated or saturated with resin before or after they are wrapped around, laid over, or otherwise attached to a surface. The multiple layers are at least partly or partially cured by heating the resin and constitute a heat-cured resin-impregnated reinforcement wrap (HRW) to reinforce the structure against external and internal loads. Such loads include weight, impact load, blast load, fluid pressure, ballistic load, and the like. In various embodiments, HRW includes multiple reinforcement sheets layered in various configurations and orders.

In some embodiments it may be preferable for the HRW to be bonded to the surface it covers and in other embodiments it may be preferable for the cured HRW not to be bonded to the surface it is in contact with. In various embodiments, such as when reinforcing a wall or a ceiling, the HRW may not be wrapped around the structure but rather be attached to, laid over, or bonded to a surface of the wall or ceiling. The described methods and apparatus may be used for reinforcing the inside or the outside of some structures such as pipes and chimneys.

Please note that in this specification, depending on the context, both the heat-cured resin-impregnated reinforcement wrap and the heat-curable resin-impregnated reinforcement wrap will be referred to as "HRW". (A heat-curable resin-impregnated reinforcement wrap will be a heat-cured resin-impregnated reinforcement wrap after the application of heat.)

Structural repair can be expensive, cumbersome, and time consuming. Structures can get damaged due to a variety of factors, such as earthquakes, overloading, weight of traffic, wear and tear, corrosion, explosions, internal fluid or gas pressure, and the like. Prevention is generally more cost-effective than repairs. As such, it is generally easier and more cost-effective to strengthen a structure that may be exposed to damaging forces and loads, than waiting to repair such eventual damages after they occur or to replace the structure with a new one. Intentional damage inflicted upon infrastructure, by terrorism or vandalism, is another way that structural damage may result. For example, recently, there has been growing interest to strengthen the above-mentioned structures for blast loading, such as terrorist attacks, which may seek to blow up a gas or oil pipeline by placing a bomb adjacent to the pipeline and detonating it. In addition to prevention, if damage does occur to a structure, a cost-effective and speedy method of repair is clearly desirable. One example of this includes a concrete floor or wall where due to adverse environmental conditions, a portion of the reinforcing steel has corroded; HRW can serve as external reinforcement applied to the surface of the slab or wall to compensate for the loss of strength caused by the loss of steel reinforcement and to protect the remaining steel reinforcement from future corrosion.

One of the problems with, for example, existing pipes and culverts is that they are subject to corrosion that weakens these structures. Since these culverts and pipes may be buried in soil, it is more cost-effective and thus preferred to repair them without digging them out. Often, these pipes are subjected to traffic, soil, and backfill loads from above in addition to internal fluid pressure. Thus a repair material and method should not only provide protection against corrosion, but also provide additional strength for the pipe.

Using a fabric impregnated/saturated resin for structural reinforcement, such as described by Raji in U.S. Pat. No. 5,931,198 or described by the incorporated references above has several shortcomings such as those listed below:

a) Because the ambient-cured epoxies have a short pot life of about one hour, the fabric saturated with those resins must be applied to the pipe surface in about one hour, before the resin starts to harden. This requires special attention by the crew and proper scheduling and coordination to make sure that the fabric is installed within the available time window.
b) The one-hour window prevents the workers to saturate the fabric the day or the night before it is installed on the pipe surface; therefore, much of the precious limited available time during the repair should be spent on saturating the fabric with resin.
c) Once the fabric is applied, it will take a full day before the ambient-cured resin and fabric is fully cured and the pipe can be put back in service. There are many situations in which such a long curing time is not available, which results in either not using resin-saturated fabric for repair or halting the use of the structure until the resin is cured.
d) The ambient-cured resins require a minimum temperature of approximately 45-50 degrees Fahrenheit for the curing of the resin to start. This prevents the repair of any structure in colder climates or in cold days when the temperature does not rise above 50 F.

The above exemplary factors are some of the shortcomings of the current methods and apparatus because the majority of the repairs on, for example, pipelines must be conducted in a short time. The job schedules are typically given in hours, underlining the importance of repairs materials and methods that allow fast repairs. In general the time required to wait for the resin to cure is a major shortcoming of current methods. Likewise, as an example, when a sea wall or a pile has to be repaired in a cold region such as Alaska, for most of the year ambient-cured resins cannot be used because the temperature may not rise above the 45-50 F that is necessary to activate the resin for curing. As described in detail below, the present disclosure overcomes such shortcomings and more.

FIGS. 1A-1D show example structures suitable to be reinforced with HRW. FIG. 1A shows a cylindrical pipe 102 in a horizontal position, while FIG. 1B shows cylindrical structure 112, such as a pipe, a column, a pile in water, a silo, a chimney, and the like. FIGS. 1C and 1D show structures 122 and 132 with rectangular cross-sections, such as beams, slabs, walls, chambers, and rectangular columns. Any of these structures may be reinforced by the HRW. Structures of relatively smaller sizes and accessible configurations, such as pipes and columns, may be wrapped with HRW, while relatively larger and/or inaccessible structures such as walls, entire buildings, and the like may be augmented with HRW on their surfaces, which may be exposed to potentially damaging loading, such as external wall surfaces. Smaller diameter pipes, for example, can be repaired by applying HRW to the interior surface of the pipe using a device such as a packer. Those skilled in the art will appreciate that the structure to be reinforced may have any cross sectional shape in addition to round and rectangular, such as triangular, oval, polygonal, irregular, and the like.

Figure 2A:
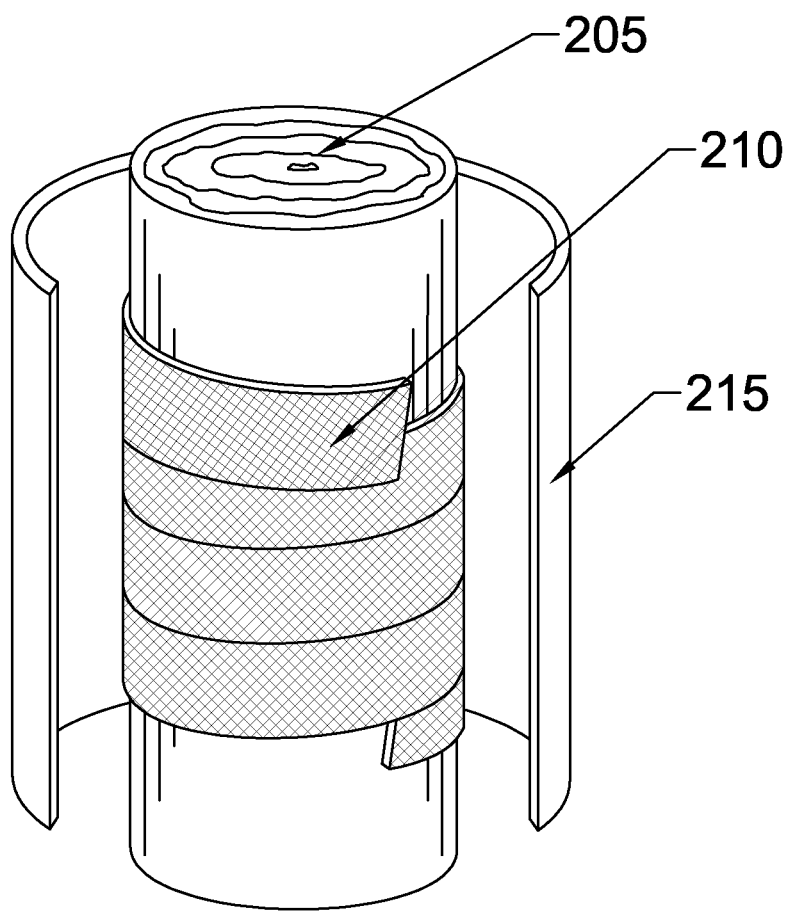
FIGS. 2A and 2B show example HRW around sample structures and sample heating blankets used for heating the HRW.

FIG. 2A shows an embodiment of the HRW 210 wrapped around sample structure 205, which is a wood pile in this case, and a sample heating blanket 215 used for heating the HRW 210. During the first stage of this example the HRW 210 is spirally and overlappingly wrapped around the wood pile 205. In this stage the resin or glue of the HRW 210 is uncured. During the second stage the heating blanket 215 is wrapped over the entire or a part of the wrapped HRW 210 to either completely or partially cure the resin or glue of HRW 210. After application of heat for a desired time at a desired temperature, the heating blanket 215 may be removed or be left in place indefinitely. In some embodiments the heating blanket may be first wrapped around, laid over, or attached to the surface of the structure to be reinforced and be sandwiched between the HRW 210 and the surface of the structure. In other embodiments the heating blanket may be sandwiched between different layers of the HRW 210.

It is important to note that the method of applying the HRW to any structure and the method of heating the HRW may widely vary in different applications and for different situations, a few examples of which will follow. In some embodiments the heating apparatus may be actively heated such as by electricity, by circulating hot air, hot water or steam, or by a chemical reaction. In other embodiments the heating of HRW may be passive such as using a preheated sheet of metal. In yet other embodiments the heating may be performed by blowing hot air or intense light at the HRW. In various embodiments the heating apparatus may be a combination of more than one devices such as a preheated flexible sheet of metal covered by a blanket or LAMINAHEAT® (hereinafter referred to as "LaminaHeat," is a new non-metallic thin film heating technology), etc.

Figure 2B:
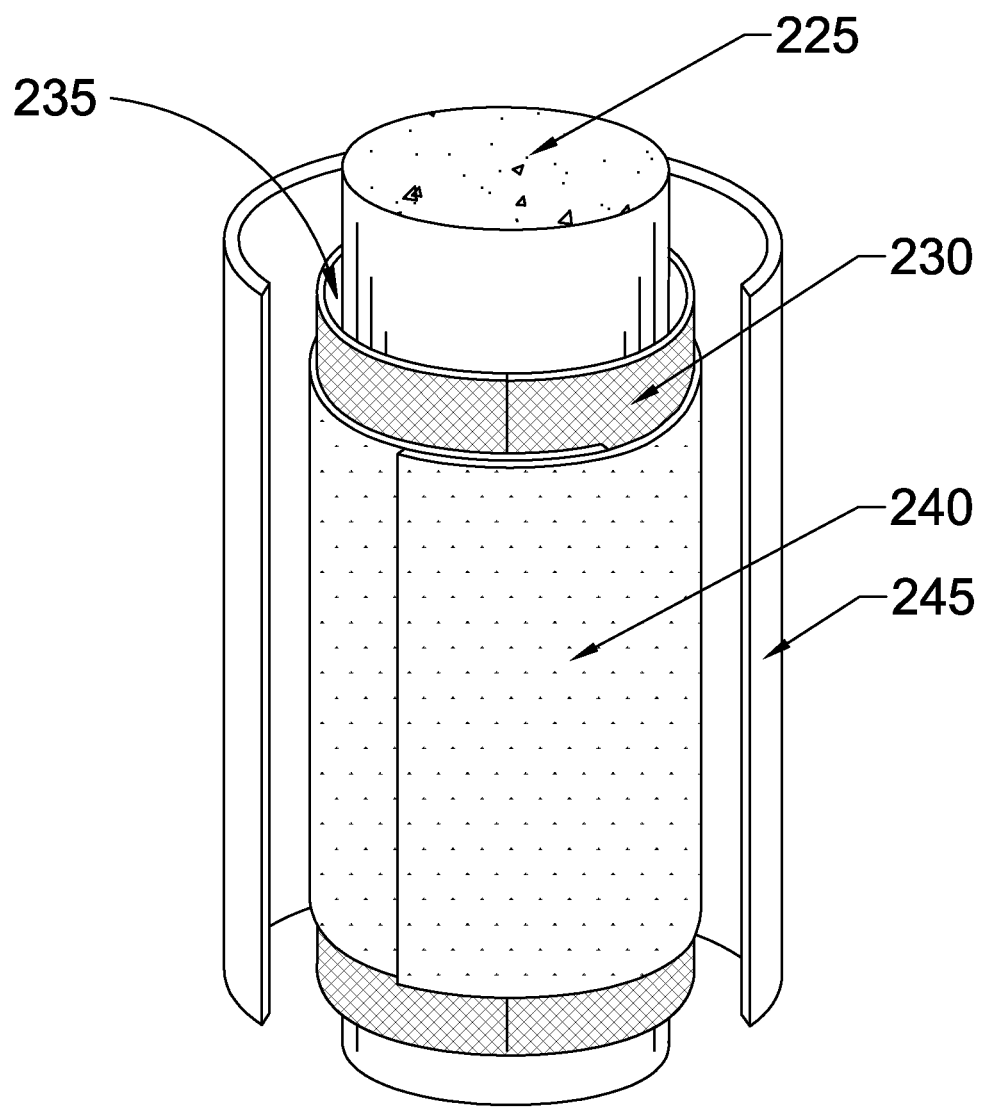

FIG. 2B shows another embodiment of the HRW 240 wrapped around a sample spacer shell 230, which in turn surrounds the concrete column 225, and a sample heating blanket 245 used for heating the HRW 240. In this example, which includes a new method of reinforcement described in the allowed patent application Ser. No. 13/409,688 of the inventor, the structural element 225 is first surrounded by a spacer shell 230. Subsequently the spacer shell 230 is wrapped with HRW 240 to create a strong reinforcement shell around the structure 225 and to allow pouring of grout or other reinforcement materials into the space 235 between the structural element 225 and the spacer shell 230. Up to this point the resin or glue of the HRW 240 is uncured. Before or after pouring of the grout into space 235, the heating blanket 245 is wrapped around the entire or a part of the wrapped HRW 245 to either completely or partially cure the resin or glue of HRW 240. After application of heat for a desired time at a desired temperature, the heating blanket 245 may be removed or be left in place indefinitely. In some embodiments the heating blanket 245 may be first wrapped around, laid over, or attached to the surface of the spacer shell 230 and be sandwiched between the HRW 240 and the surface of the spacer shell 230. In other embodiments the heating blanket 245 may be sandwiched between different layers of a multilayer HRW 210.

Those skilled in the art recognize that additional reinforcement material such as still rebars or carbon strips may be placed inside space 235.

As can be seen in the example of FIG. 2B, the method of applying the HRW 240 to structure 225 is different from the method illustrated in FIG. 2A. In this example the HRW 240 in not spirally wrapped; however, it can be wrapped overlappingly as many times as desired. The method of heating the HRW 240 may also vary as described above. The structures 205 and 225 may be any structure such as a column, pile in water, utility pole, chimney, pipe and the like. In various embodiments the structures 205 and 225 are wrapped with one or more layers of HRW 210 and 240, continuously or in sections.

Figure 2C:
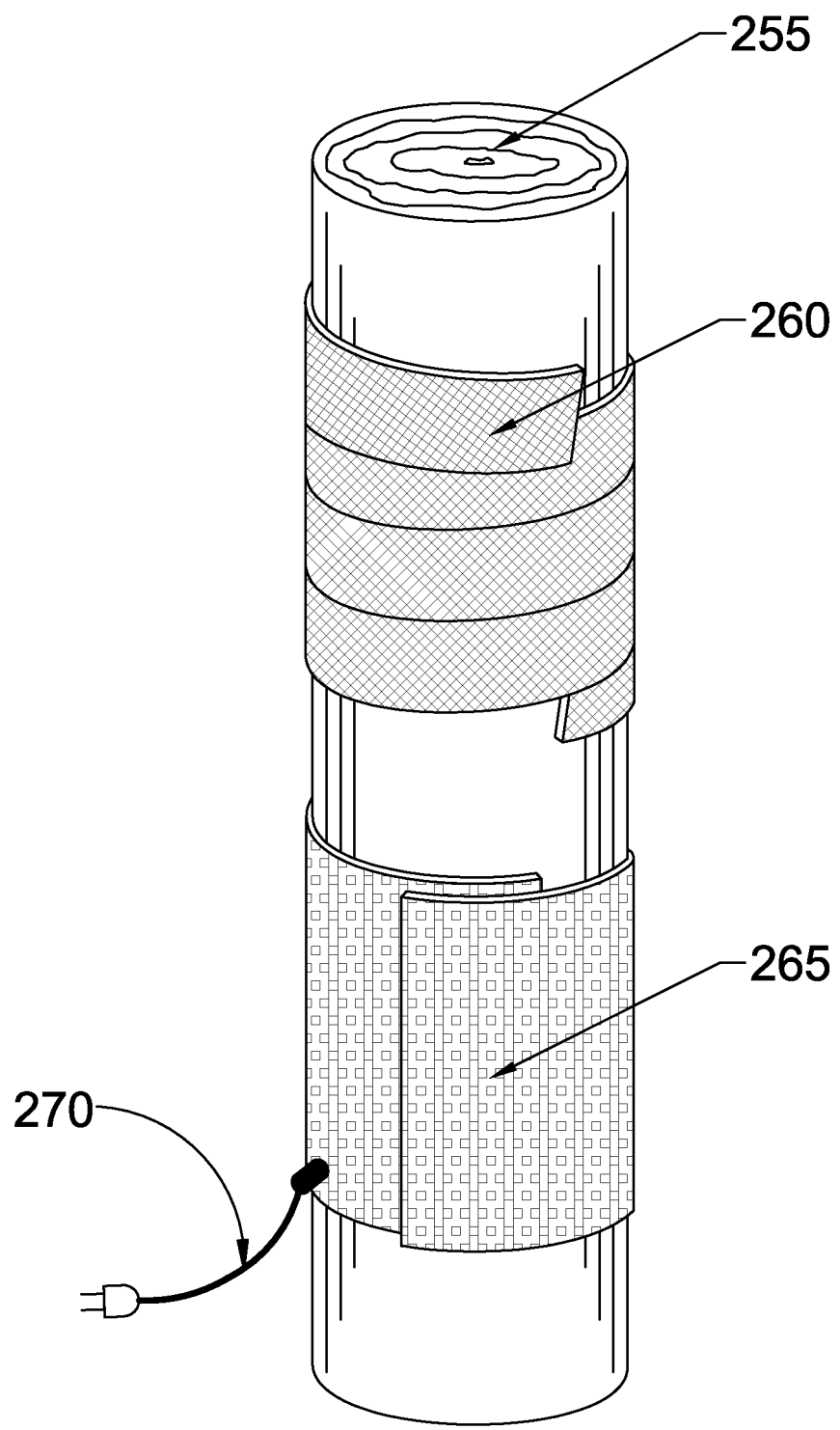
FIG. 2C shows two other example HRW, around a sample structure, that are heated and cured without a blanket.

FIG. 2C illustrates two more sample embodiments in which the heat is generated either by the resin itself or by the reinforcement sheet, without the need for a heating jacket or a heating element of any kind. As described below, both of these sample HRWs are shown wrapped around the same structure 255. The first embodiment is shown as HRW 260. In this embodiment the heat-curable resin, similar to those sold by Boyce Components LLC in Phoenix, Ariz., can be heated and cured by passing an electrical current through the resin. One exemplary method for passing electrical current through the resin of this embodiment is to have appropriate conducting exposed wiring in the reinforcement sheet of HRW 260 and connecting some of the wires to a negative pole and some to a positive pole of a power supply and forcing an electrical current to flow through the resin which is in contact with wires. In another method of heating the resin, current-conducting meshes or wires can be placed over or under HRW 260 and be connected to a negative and a positive pole of a power supply to cause an electrical current to flow through the resin to heat the resin up until it is at least partially cured. After curing the resin, such meshes or wires may be left in place or be disassembled and reused.

The reinforcement sheet of the other embodiment depicted by HRW 265 of FIG. 2C generates heat by connecting it to the electricity. For example the reinforcement sheet of HRW 265 may include a network of resistor wires that may be connected to a power supply through cable 270. In contrast with the previous embodiment, in this embodiment heat is generated by the reinforcement sheet and through its resistor wiring, and no current passes through the resin.

Those skilled in the art recognize that wrapping such reinforcement around the entire circumference and overlapping the ends create a reinforcing structure that offers significant confinement for the structure being repaired.

In various embodiments an external temporary frame or support may be erected to push the heating element against the HRW and hold it in that contacting position for several minutes until the HRW is at least partially cured. In some embodiments the space between the exterior surface of the structure and the HRW can be filled with resin or tack coat. Such tack coat, before the installation of the HRW, may be applied either directly to the exterior surface of the structure or it can be applied to the HRW.

In various embodiments the entire or a large portion of the structure can be substantially enclosed in an insulating blanket and the space between the HRW and the insulating blanket can be heated to cure the HRW rapidly. Electrical, propane and oil heaters, heating lamps, UV lamps, heated air, and the like can be used as heating sources to raise the temperature of resin saturated fabric.

In various embodiments for external structure reinforcement of a pipe, column and the like a rope, a strap or a cable can be wrapped around the heating element or HRW to hold it in position until the resin is cured.

The application of HRW layer(s) to the interior surface of a pipe, a tank, a chimney or the like is substantially the same as it is described above with respect to FIGS. 2A and 2B. A layer of resin or tack coat may also be applied in the space between the HRW and the interior surface of the structure. If the structure is a conduit and if the structure is large enough to allow man-entry, the crew can hold the heating element against the resin-saturated fabric that has been applied to the surface of the structure to expedite the curing process. As known to those skilled in the art, the heating element can be supported on a variety of spring-loaded frames and inflatable balloons and the like to ensure that the heating element remains in contact and close proximity to the resin-saturated HRW while the resin cures. For various structures, particularly for pipes, the internal reinforcement may be used to resist internal pressures, such as fluid and gas pressures, and also to resist and/or repair corrosion and wear and tear. Additional layers of reinforcement sheets or honeycomb panels may be included in the HRW to provide the required strength and ring stiffness per engineering design requirements for external loads from soil, traffic, and the like. Layers of HRW may be applied continuously inside a structure to create a closed multi-layered reinforcement structure.

In some embodiments, for example when a pipe is being repaired, it is desirable to have a watertight HRW. One way to achieve this is to include one or more layers of a resin-saturated chopped fiber mat or veil as the exterior face of the HRW. Additional, coatings of polymers, cementitious materials and the like may be used.

In other embodiments when the structure being repaired is a chimney or a sewer manhole, for example, the HRW can create a reinforcing structure that will prevent any deteriorated brick or spalled concrete from falling into the chimney or the manhole.

In various embodiments, the reinforcement layers are applied to the surface of the structure to be reinforced, one layer at a time using appropriate resin. Once a section of the structure has been repaired, the process is repeated until all regions of the structure that require remediation are repaired.

In certain applications, it may be necessary to apply a layer of thickened resin to the surface of the structure to secure the reinforcement layer in place before the heat is applied to cure the resin. As known to those skilled in the art, this can be achieved by adding a filler material such as silica fume, Cab-O-Sil® and the like to the resin and mixing the two thoroughly to obtain a higher viscosity resin commonly known as tack coat. Tack coat could also be applied between the reinforcement layers. Other pre-mixed tack coats such as Quake-Bond™ J201TC (Tack Coat) can also be used to hold the resin-impregnated fabric layers in place or to prevent the entire HRW from sliding down a vertical repair surface or fall off an overhead repair surface, for example when a ceiling of a room or the crown portion of a pipe is being repaired.

In other embodiments, the HRW may be applied to various structures, such as pipes and culverts, using automated machinery, such as robotic apparatus to facilitate and automate the installation of the HRW inside or outside a pipe or other structure. Such robotic apparatus may be used to provide further economic advantage for all applications described herein.

Figure 3:
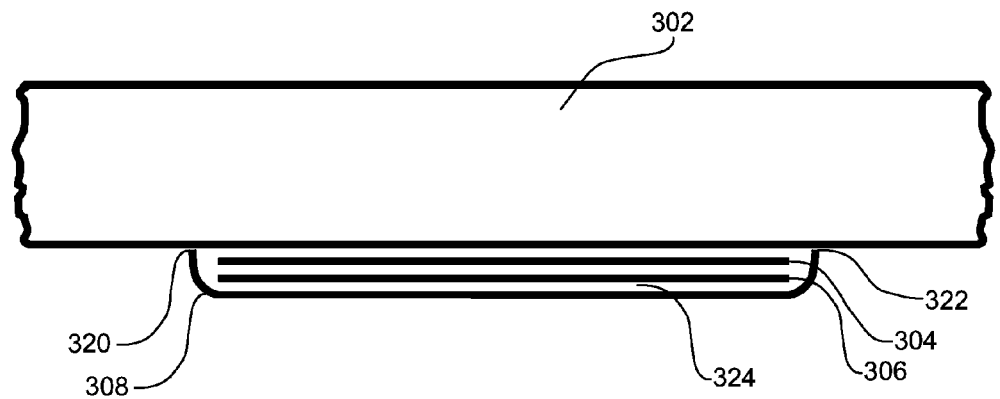
FIG. 3 shows an example cross-sectional view of an external structure reinforcement method using HRW.

FIG. 3, which depicts a cross-sectional view of a reinforced structure such as the one illustrated in FIG. 2A, shows an example external wall-structure reinforcement using HRW. As known to those skilled in the art, the surface of the structure 302 may have to be repaired, for example by removing corrosion-damaged reinforcing steel or patching of deteriorated concrete to provide a smooth surface, sand-blasting or otherwise removing any paint, residue, oil, pressure-washing to remove any dust, etc. In various embodiments, structure 302 is wrapped, covered, or augmented with HRW layers 304. The HRW layers 304 are then heated to a temperature of 250-350 F, allowing the HRW to cure rapidly. In various embodiments, a heating element 306 can be provided and activated for a short time to facilitate the curing of the resin in HRW. In some of the embodiments, the heating element can be an electrical heating blanket.

In various embodiments the heating element 306 can be similar to those manufactured by LaminaHeat® (Natick, Mass.). These laminates can be custom-made to any length and width with varying degrees of rigidity or flexibility. The LaminaHeat® is connected to an electrical outlet and a control unit and provides a perfectly uniform temperature over the entire surface of the LaminaHeat®. The LaminaHeat® is dialed to a desirable temperature, e.g. 250-350 F that would allow curing of the resin-saturated HRW in about 5-10 minutes. In various embodiments, the heating element 306 can be pressed against the resin-saturated sheets and held in that proximity position to further expedite the curing. The heating element may be bonded to a sheet of metal such as aluminum, copper, or steel in which case the heating element will heat the sheet of metal and in turn will heat the resin-saturated HRW. The heating element may also include an insulating layer on the back face to allow for higher energy efficiency and to minimize the loss of heat away from the HRW.

In various embodiments the heating element 306 may be a bladder or mattress that is filled with hot air, steam, water, oil or gas to facilitate rapid curing of the HRW 304. In various embodiments the HRW can be further covered with an insulating blanket 308 preferably large enough to cover the HRW and extend beyond it. The edges 320 and 322 of the insulating blanket 308 can be sealed against the surface of the structure 302 to create a substantially enclosed space 324. The enclosed space 324 can be heated, as an example with hot air or steam and the like to allow fast curing of the HRW.

In various embodiments, once a section of the structure 302 is repaired with HRW, the process can be repeated to repair or strengthen other portions of the structure. In various embodiments, a new layer of HRW may be overlapped with the previously-applied layer. The length of such overlaps is a function of the project requirements and may be designed by an engineer.

Figure 4:
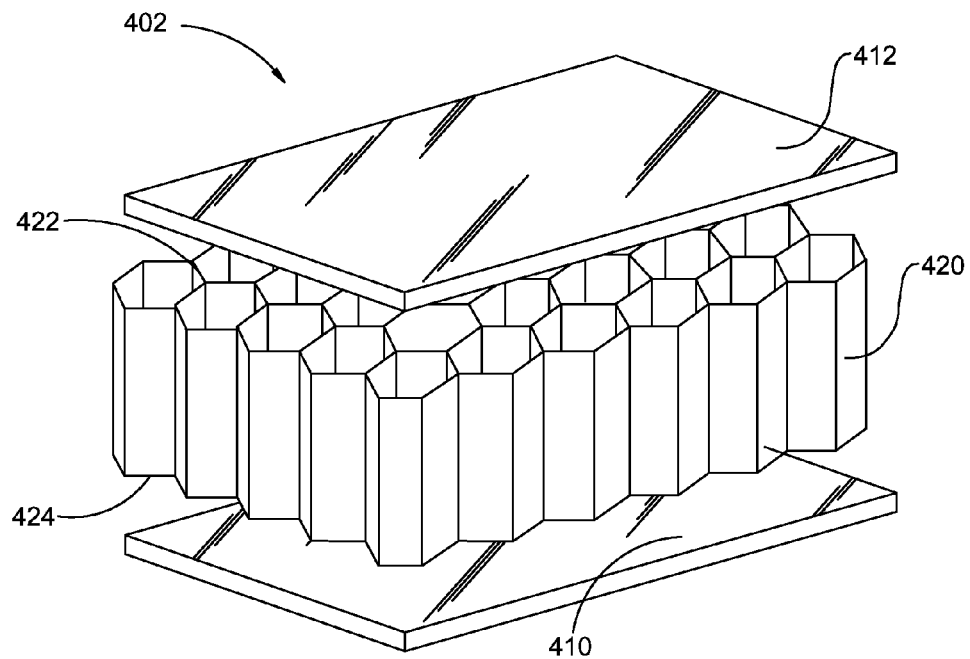
FIG. 4 shows an embodiment of a HRW.

FIG. 4 shows an example HRW 402 constructed from and including reinforcement layers 410, 412, and honeycomb layer 420. Honeycomb layer 420 is generally constructed of adjacent cells, each cell having walls that enclose the cells. Within each of the cells and surrounded by the cell walls, a hollow space is created to reduce the weight of the honeycomb or hollow-structure layer. The cell walls create a relatively thick sheet, the thickness of the sheet being substantially determined by the height of the cell walls, which sheet has substantially greater stiffness compared to a flat sheet of the same sheet material without such cells and cell walls. The honeycomb layer 420 include a top surface 422 and a bottom surface 424. Those skilled in the art realize that many honeycomb panels include reinforcement sheets called veil attached to the surfaces 422 and 424. Additional reinforcement sheets can also be glued to the surfaces 422 or 424 to further increase the strength and stiffness of the honeycomb panels.

In various embodiments, the reinforcement layers 410 and 412 are constructed from fiber-reinforced material, such as Fiber Reinforced Polymer (FRP) to give the sheets more resistance against various types of loading, such as blast loading. Those skilled in the art will appreciate that many types of reinforcement fibers may be used for reinforcement including polymer, fiberglass, metal, cotton, other natural fibers, and the like.

The sheet materials may include woven or unwoven fabrics made with fibers such as glass, carbon, KEVLAR® (hereinafter referred to as "Kevlar," is a synthetic fiber of high tensile strength used especially as a reinforcing agent in the manufacture of tires and other rubber products and protective gear such as helmets and vests), basalt, and the like, saturated with a polymer such as polyester, vinyl ester, or epoxy for added strength, wear resistance, and resilience. The fibers within a reinforcement sheet may be aligned in one direction, in cross directions, randomly oriented, chopped short pieces, or in curved sections to provide various mechanical properties, such as tearing tendency and differential tensile strength and stiffness (rigidity) along different directions, among others. Sample fabrics include QuakeWrap® VB26G glass fabric and QuakeWrap® TU27C carbon fabric as well as woven, stitched, or chopped fiber mats. In addition, three-dimensional (3D) fabrics such as those manufactured by China Beihai Fiberglass Co. Ltd. (www.fiberglassfiber.com) can also be used to provide additional stiffness and rigidity.

As is known to those skilled in the art, direct contact between carbon fiber and a steel structure can lead to galvanic corrosion. Therefore, when a steel structure is being repaired or strengthened, a dielectric barrier layer such as polyester, glass, basalt or Kevlar fabric or veil can be applied directly to the steel structure, followed by additional layers that could be made of any fibers including carbon fiber.

The reinforcement layers 410, 412 and 420 may be laminated in the field using epoxy, various glues, or similar adhesives to create a thick laminate that will be stiffer than the sum of the individual reinforcement layers 410, 412 and 420 placed around the structure being repaired or strengthened. Different reinforcement layers may use sheets with fibers oriented in different directions, such as orthogonal directions, with respect to other sheets to further reinforce the HRW. In particular, resins such as QuakeBond™ HCR (Heat-Cured Resin) are preferred for this application. These resins offer the advantage of having virtually an infinite pot life in ambient temperature; that is, a fabric saturated with such a resin can be prepared one or more days before installation and it will not harden in ambient temperature. At the same time, once the fabric is subjected to a heat of 250-350 F, the resin will cure in less than 10 minutes. This is a tremendous improvement over passive curing methods that requires a day or more for the resin to cure.

Those skilled in the art recognize the need for use of a thickened resin, in some embodiments, often referred to as tack coat. Tack coat can be made in the field by thoroughly mixing a very lightweight additive such as silica fume with the resin; common mix ratios are 1-3 grams of silica fume for every 100 grams of resin. Among the advantages of tack coat is that when applied to a surface it provides a sticky or tacky surface that prevents movement and sliding of the reinforcing layers prior to curing of the resin. Tack coat, for example, can be used when HRW is applied to a vertical wall or to the crown section of a pipe and it will prevent the HRW from falling down. In various embodiments, tack coat can be added between the various reinforcing layers of the HRW or between the HRW and the structure being repaired.

When heat is applied to heat-curable epoxies to cure them, these resins usually go through a chemical change that reduces their viscosity prior to curing. The low viscosity resin will run off any vertical or overhead (ceiling type) application. Silica fume can be added to thicken the epoxy and prevent it from dripping during the heating phase.

With continued reference to FIG. 4, reinforcement sheets 410 and 412 are available from industrial sources and at the present range in thickness from about 0.020 inches to a few inches depending on the application. Those skilled in the art will appreciate that thinner or thicker sheets may be constructed and used as needed. Hollow or 3D fabrics such as those manufactured by China Beihai Fiberglass Co. Ltd. can also be used as reinforcing elements for HRW. 3D fabrics are typically constructed of two reinforcing fabric layers connected by a series of short fibers, called piles. When the fabric is saturated with resin, as the resin cures, the piles rise and create a gap between the two reinforcing fabric layers. The two fabric layers behave like the flanges of an I-beam cross section and the piles behave like the web of an I-beam. This results in a very stiff reinforcement layer that is far stronger and stiffer than the sum of the two reinforcing fabric layers. The honeycomb laminate or the 3D fabric structure provides additional strength to HRW and may serve as a structure to dissipate impact and blast energy, resulting in less damage to the reinforced structures. The HRW can be made with or without 3D fabric and with or without the honeycomb 420.

In other various embodiments, some or all of the honeycomb or hollow-structure cells may be filled with one or more of a filler material, such as foam, concrete, polymer, and the like to displace the air within the cells and provide additional strength to the honeycomb or hollow-structure layer. The cell filling material may be injected or be otherwise placed within the cells after attaching the first honeycomb or hollow-structure skin layer, and then be covered and glued in place with the second skin layer. The skin layers themselves may be multi-layered in some embodiments. For 3D fabrics, the filler materials can be applied or introduced from the open sides and edges to fill the gap between the two reinforcing fabric layers.

In various embodiments two or more layers of the HRW may be glued to each other to form one integral laminate wrap. In some embodiments, each layer in the HRW may be made from a different or same type of reinforcement sheet to develop different costs, performances, and mechanical properties for the HRW. For example, the outer layers may be made from thicker and tougher reinforcement sheets while the inner layers (closer to the structure) may be made from thinner and more flexible sheets to save material and installation or construction costs. Other variations in sheet layers are possible, such as fiber types and orientations, sheet materials, sheet material properties like chemical resistance, heat resistance, gas and fluid impermeability, and the like. HRWs made with such variations in reinforcement layers will exhibit different mechanical and chemical properties suitable for different applications, costs levels, and considerations such as environmental and public safety considerations.

In different embodiments, multiple layers of same or different materials may be laminated together before being applied to a surface or one by one may be applied to the surface over each previous layer. Similarly, the layers may be impregnated or saturated with heat-curable resin before or after they are wrapped around, laid over, or attached to a surface.

In various embodiments, the HRW may include one or more layers of a resin-impregnated veil or chopped fiber mat on one or both outside surfaces of HRW to provide an impervious layer that will not allow passage of any water or vapor through the HRW. The use of a light-weight and tightly woven veil or chopped fiber mat is, as an example, a preferred embodiment when a pipe is being repaired with HRW. These veils and chopped fiber mats are typically made with polyester or fiberglass and at the present weigh approximately 2 oz per square yard.

In various embodiments, the HRW can be coated with a final finishing coat referred to as top coat. The top coat can be a resin, a cementitious finish such as stucco, a fire-proofing material and the like that can be applied by rolling, brushing, spraying and the like. Such coating can, for example, provide additional resistance against abrasion or chemicals.

Figure 5:
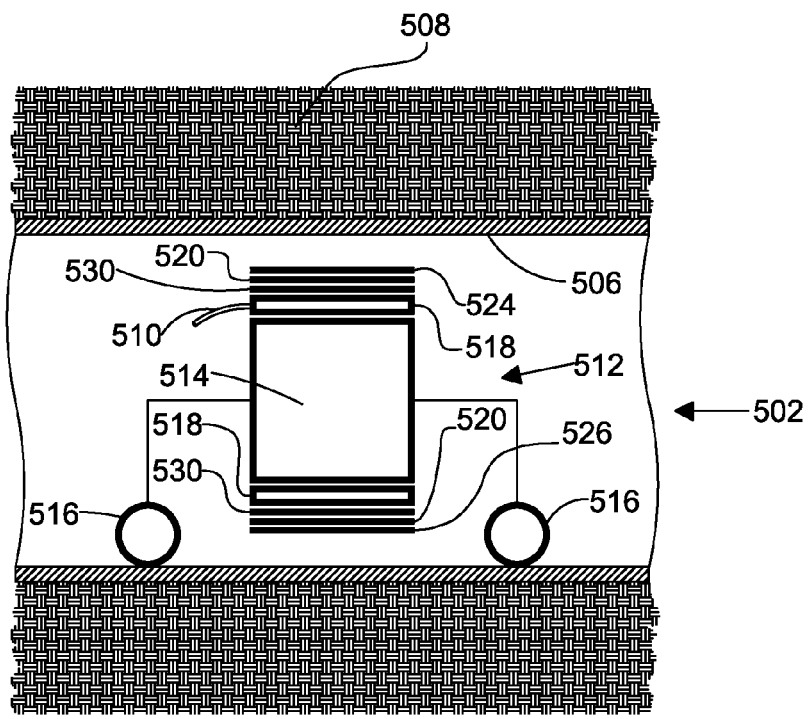
FIGS. 5A-5B show an example internal conduit structure reinforcement using HRW with the aid of a packer device.
Figure 5:
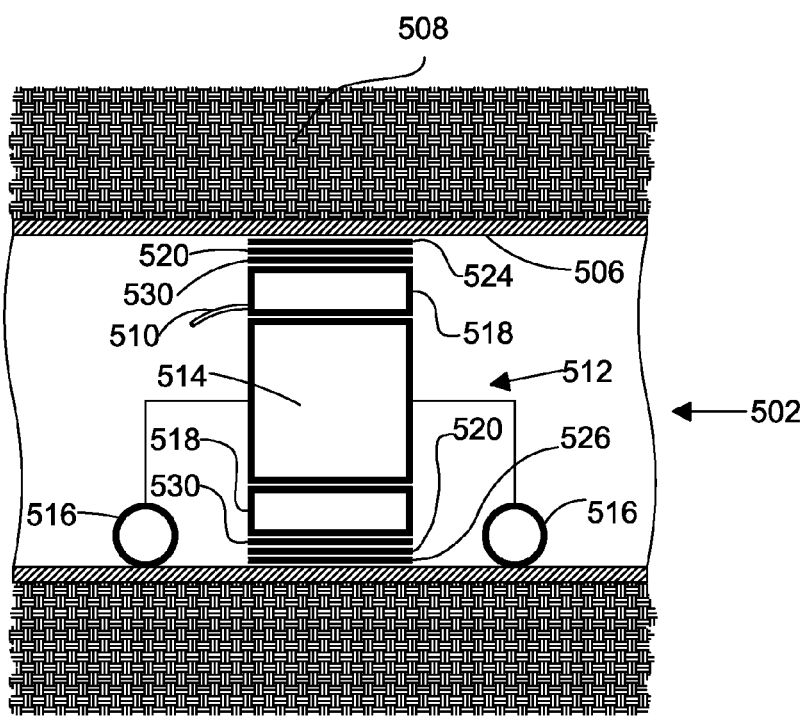

FIG. 5A shows an example internal structure reinforcement using HRW applied using a device known as a packer. A structure, such as pipe 502 having an interior surface 506 may be buried under ground and covered with soil 508 to a certain depth, is reinforced with HRW 524 and 526. In this example, the packer 512 consists of a hollow cylindrical structure 514 that is supported on wheels 516. A rubber bladder 518 is attached to the outer surface of the cylinder 514 and a tube 510 is provided to inflate the bladder 518. The heating element 520 is wrapped around the rubber bladder 518 and one or more layers of resin-saturated reinforcement sheet 524 and 526 are wrapped on the outside of the Heating element. An insulating blanket 530 may be used to improve efficiency by reflecting the heat of the Heating element back towards the HRW and to avoid damaging the bladder 518 from excessive heat.

FIG. 5B shows the packer assembly positioned in the area requiring repair after air is introduced through the tube 510 to inflate the bladder 518. The bladder will expand and the layers of fabric will slide on top of one another until the resin-saturated reinforcement fabrics are pressed tightly against the surface of the pipe. At that time the Heating element is activated, for example by introducing electrical current, to heat the HRW and the air pressure in the bladder is held substantially constant until the resin is cured, at which time the air pressure is released, allowing the bladder and the Heating element to collapse and leaving the cured reinforcement sheet on the surface of the pipe. This process can be repeated until all required segments of the pipe are repaired. As known to those skilled in the art, the use of a bladder in such applications presses the HRW against the surface of the pipe being repaired and forces the HRW to conform to the profile of the pipe, even if the pipe surface is not perfectly even and or smooth.

In some embodiments, after applying the resin-saturated fabric to the inside wall of the pipe, hot air of desired temperature may be injected into the pipe for curing the resin. Additionally, it is possible to isolate a part of the pipe for the curing process by trapping the hot air between two balloons that are inflated within the pipe at a distance from each other. With such a method the resin-saturated fabric in a large span of the pipe may be cured in a few minutes.

In some embodiments the surface of the pipe may be coated with a layer of epoxy, for example by spraying, rolling or brushing, before the HRW is applied. In another embodiment in lieu of or in conjunction with the Heating element the bladder 518 can be filled with hot air, steam or gas to facilitate the curing of the HRW.

As known to those skilled in the art, the same procedure as describe above can be used with slight modification to repair smaller diameter pipes where man-entry is not possible. In such case, normally a section of the pipe is cut and partially removed to provide a launching station for the repair. The packer, the Heating element, the insulating blanket, and the layers of resin-saturated fabric are wrapped around the partially-deflated bladder and the entire assembly is inserted into the pipe and is pulled using a winch and a camera to position the assembly at the desired repair location. At that time the bladder is inflated and the Heating element is energized for curing to take place. Once the resin is cured, the bladder is deflated and the packer, the Heating element and the insulating blanket are pulled back to the launching station.

This process may be repeated in sections along the length of the pipe in an incremental manner until the entire pipe is reinforced. The edges of the HRW sections along the length of the pipe may be overlapped and sealed to ensure that the HRW creates a virtually airtight ceiling for the pipe so that the $H_2S$ gases or other gases, liquids, or corrosive elements are substantially prevented from reaching the pipe surface 506. The joints between HRW sections along the length of the pipe may be joined shut using epoxy or thermal techniques.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A method of reinforcing a structure using heat-curable-resin, the method comprising:
    forming a spacer shell around the structure such that there remains a gap between the spacer shell and a surface of the structure;
    wrapping around, laying over, or attaching a heat-curable-resin impregnated reinforcement sheet (HRW) to a surface of the spacer shell surrounding the structure;
    heating entirety of the HRW, simultaneously, by an external heating element to a pre-determined higher-than-ambient temperature to at least partially cure the entire of the HRW; and
    pouring reinforcement material into the gap between the structure and the spacer shell.

2. The method of claim 1, wherein the HRW includes one or more layers of honeycomb or hollow-structure layer or is a lamination of multiple layers of sheets.

3. The method of claim 2, further comprising filling some or all cells of the honeycomb or hollow-structure layer with at least one filler material.

4. The method of claim 1, wherein the HRW includes one or more layers of 3D fabric.

5. The method of claim 1, wherein the HRW is made of glass, carbon, synthetic fiber of high tensile strength or basalt fibers.

6. The method of claim 1, wherein a space between the spacer shell and the structure is filled with grout or other curable material prior to or after heating the HRW.

7. The method of claim 1, wherein the external heating element is a passive or active, solid, liquid, light, electrical, or gaseous heating element, or is a non-metallic thin film heating technology that is activated with electrical power, or is a bladder filled with hot air, gas, liquid, steam, or fluid, or wherein the spacer shell also acts as the heating element, or is a combination thereof.

8. The method of claim 1, wherein the HRW further comprises multiple layers of same or different materials that are laminated together before being applied to the surface or are one by one applied to the surface over each previous layer, and wherein the HRW layers include or do not include a heating layer.

9. The method of claim 1, wherein the HRW includes at least one kind of reinforcing fibers.

10. The method of claim 1, wherein the HRW is impregnated after or before being wrapped around, laid over, or attached to the structure.

11. The method of claim 1, wherein the HRW is attached to the inside or outside surface of the structure, or both.

12. The method of claim 1, further comprising the step of applying resin to the surface of the structure prior to applying the HRW.

13. The method of claim 1, further comprising the step of pressing the heating element against the HRW to keep the heating element in substantially full contact with the HRW.

14. The method of claim 1, wherein the at least partially cured HRW bonds or does not bond with the surface of the structure or with the surface of the spacer shell.

15. A method of making an apparatus for reinforcing a structural element, the method comprising:
 fabricating a spacer shell for surrounding at least a part of the structural element;
 providing a heat-curable resin or glue configured to be substantially cured at temperatures in excess of a known temperature;
 fabricating a reinforcement sheet saturated or impregnated with the heat-curable resin (HRW);
 heating with an external heating element, entirety of the impregnated or saturated reinforcement sheet, simultaneously, to desired temperatures in excess of the known temperature; and
 wherein the HRW is wrapped around, is laid over, or is attached to a surface of the spacer shell and is heated by the external heating element to a temperature above the known temperature until the resin is at least partially cured.

16. The method of claim 15, wherein the HRW includes one or more layers of honeycomb or hollow-structure layer or is a woven or a non-woven 2- or 3-dimensional fabric, or a combination thereof.

17. The method of claim 15, wherein the HRW is made of glass, carbon, synthetic fiber of high tensile strength or basalt fibers or includes at least one kind of reinforcing fiber.

18. The method of claim 15, wherein a space between the spacer shell and the structure is filled with grout or other curable material prior to or after heating the HRW.

19. The method of claim 15, wherein the external heating element is a passive or active, solid, liquid, light, electrical, or gaseous device or is a non-metallic thin film heating technology, or is a bladder filled with hot air, gas, liquid, steam, or fluid, or wherein the spacer shell also acts as the heating element, or is a combination thereof.

20. The method of claim 15, wherein the HRW is saturated or impregnated after or before being wrapped around, laid over, or attached to the surface of the structure or to the surface of the spacer shell.

* * * * *